No. 717,277. Patented Dec. 30, 1902.
E. W. RICE, Jr.
COMPOUNDING ALTERNATORS.
(Application filed June 8, 1900.)
(No Model.)
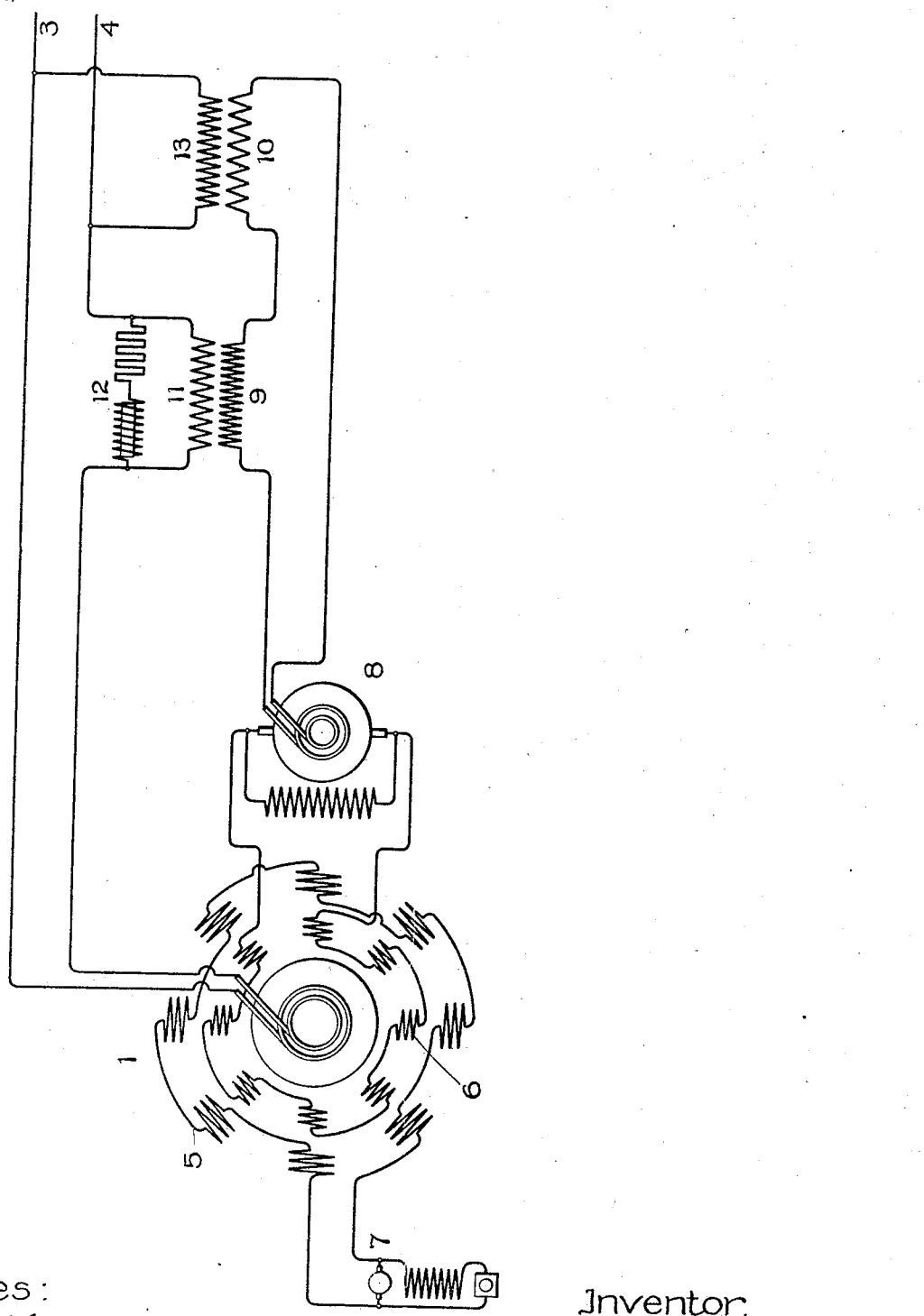
Witnesses:
Lewis P. Abell.
Benjamin B. Hull.
Inventor:
Edwin W. Rice Jr.,
by Albert E. Davis
Atty.

UNITED STATES PATENT OFFICE.

EDWIN W. RICE, JR., OF SCHENECTADY, NEW YORK, ASSIGNOR TO THE GENERAL ELECTRIC COMPANY, A CORPORATION OF NEW YORK.

COMPOUNDING ALTERNATORS.

SPECIFICATION forming part of Letters Patent No. 717,277, dated December 30, 1902.

Application filed June 8, 1900. Serial No. 19,529. (No model.)

*To all whom it may concern:*

Be it known that I, EDWIN W. RICE, Jr., a citizen of the United States, residing at Schenectady, county of Schenectady, State of New York, have invented certain new and useful Improvements in Compounding Alternators, (Case No. 1,114,) of which the following is a specification.

My present invention relates to the regulation of dynamo-electric machines, and more particularly to the regulation of an alternating-current generator or other source of energy-feeding current through a reactive transmission-line to some receiving-circuit.

In carrying out my invention I set up at the generating end of the line an electromotive force which is arranged to vary in the same proportion as the variation of electromotive force at the end of the line, and the electromotive force which I thus set up I employ to regulate the impressed electromotive force of the generator.

My invention will better be understood by reference to the following description, taken in connection with the accompanying drawing. Its novel features I will point out in the claims appended hereto.

In the drawing I have shown a generator at 1, connected to and feeding reactive transmission-lines 3 4. In the particular embodiment of the invention which I have herein shown this generator is provided with two field-windings, (indicated, respectively, at 5 and 6,) these field-windings being arranged to act in opposition to each other. The winding 5 is excited from any suitable source of direct current— such, for example, as an exciter 7—the electromotive force of which may be regulated in the usual manner by means of a field-rheostat. The winding 6, which I term a "regulating-winding," is supplied with current from the direct-current side of a rotary converter 8, the alternating-current terminals of which are connected in series with two transformer secondaries 9 and 10, the primary 11 of one of the transformers being shunted about a combination of resistance and inductance 12 representing in miniature these factors in the transmission-line, while the primary 13 is shunted across the transmitting end of the lines 3 4. In this case the transmission-line is supposed to contain only resistances and inductances, for which reason I have shown at 12 a combination of resistances and inductances, having the same relation to each other as the resistances and inductances in the transmission-line, but on a smaller scale. It will be evident, however, that if the transmission-line contains capacity the arrangement of the artificial line 12 may be varied to correspond. Owing to the fact that the artificial line 12 represents the transmission-line in miniature, it will be evident that the electromotive force or drop between its terminals will on a small scale represent the actual drop in potential in the transmission-lines. By combining the electromotive force set up in the secondary 9 with the electromotive force set up in the secondary 10 it will be evident, if suitable ratios of transformation are chosen in these transformers, that the resultant electromotive force will represent that which exists at the receiving end of the line. The electromotive force of the secondary 9 should have the same relation to that of the secondary 10 as the drop in the line has to the impressed electromotive force.

The resultant electromotive force derived from the secondaries 9 and 10, being impressed upon the rotary converter 8, gives rise to a direct current in the regulating-winding 6, which varies in proportion to the variation of electromotive force at the receiving end of the line. The winding 6, being connected into circuit so as to be in opposition in its effect to the winding 5, will decrease the resultant field strength when the electromotive force at the receiving end of the line rises and increase the field strength when the receiving electromotive force falls, thereby causing the electromotive force of the generator to vary in such a manner as will preserve a constant electromotive force at the receiving end of the line or at some other selected point on the system.

Instead of using a rotary converter for the purpose specified I may, if found desirable, employ a rectifying-commutator, and this, as well as other modifications, may be made without departing from the spirit of my invention.

What I claim as new, and desire to secure by Letters Patent of the United States, is—

1. The method of regulating an alternating-current dynamo-electric machine feeding a reactive circuit, which consists in setting up an alternating current having an electromotive force which varies in the same proportion as the variation of electromotive force at the receiving end of the circuit or at some other chosen point on the circuit, deriving therefrom a direct current, and utilizing said direct current for regulating said dynamo-electric machine.

2. The method of regulating a dynamo-electric machine feeding a reactive electric circuit which consists in setting up at the transmitting end of the circuit an electromotive force representing to a suitable scale the electromotive force at the receiving end of the circuit or at some other selected point of the system, and utilizing the electromotive force thus set up to regulate said dynamo-electric machine.

3. The method of regulating a dynamo-electric machine feeding a reactive electric circuit which consists in setting up at the transmitting end of the circuit an alternating electromotive force representing to a suitable scale the electromotive force at the receiving end of the circuit or at some other selected point of the system, deriving from the electromotive force thus set up a direct current, and passing said direct current through a winding on said dynamo-electric machine.

4. The method of regulating a dynamo-electric machine feeding a reactive electric circuit, which consists in setting up at the transmitting end of the circuit an alternating electromotive force representing to a suitable scale the electromotive force at the receiving end of the circuit or at some other selected point of the system, deriving from the electromotive force thus set up a direct current, and utilizing said direct current for purposes of regulation.

In witness whereof I have hereunto set my hand this 2d day of June, 1900.

EDWIN W. RICE, Jr.

Witnesses:
BENJAMIN B. HULL,
MABEL H. EMERSON.